United States Patent
Iorga et al.

(10) Patent No.: US 11,212,219 B1
(45) Date of Patent: Dec. 28, 2021

(54) IN-BAND TELEMETRY PACKET SIZE OPTIMIZATION

(71) Applicant: LENOVO Enterprise Solutions (Singapore) PTE. LTD., New Tech Park (SG)

(72) Inventors: Radu M. Iorga, Bucharest (RO); Corneliu-Ilie Calciu, Bucharest (RO); Roberto H. Jacob Da Silva, Oak Park, CA (US)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/913,003

(22) Filed: Jun. 26, 2020

(51) Int. Cl.
*H04L 12/725* (2013.01)
*H04L 29/06* (2006.01)
*H04L 12/801* (2013.01)
*H04L 29/08* (2006.01)

(52) U.S. Cl.
CPC ............ *H04L 45/306* (2013.01); *H04L 47/10* (2013.01); *H04L 67/327* (2013.01); *H04L 69/16* (2013.01); *H04L 69/22* (2013.01)

(58) Field of Classification Search
CPC ..... H04L 45/306; H04L 47/10; H04L 67/327; H04L 69/16; H04L 69/22
USPC ........................................................ 709/224
See application file for complete search history.

(56) References Cited

U.S. PATENT DOCUMENTS

| | | | | |
|---|---|---|---|---|
| 8,885,477 | B2* | 11/2014 | Evans | H03M 7/3066 370/235 |
| 9,258,244 | B1* | 2/2016 | Boyd | H04L 1/0002 |
| 9,648,542 | B2* | 5/2017 | Hsu | H04L 43/12 |
| 9,686,127 | B2* | 6/2017 | Ramachandran | H04L 12/4641 |
| 9,954,751 | B2* | 4/2018 | Zhang | H04L 43/0829 |
| 10,313,410 | B2* | 6/2019 | Bullotta | H04L 67/02 |
| 10,582,027 | B2* | 3/2020 | Bhandari | H04L 67/2804 |
| 10,645,002 | B2* | 5/2020 | Janakiraman | H04L 45/742 |
| 10,686,671 | B1* | 6/2020 | Mozumdar | H04L 41/145 |
| 10,917,340 | B2* | 2/2021 | Gandhi | H04L 45/74 |
| 11,050,653 | B2* | 6/2021 | Wohlschlegel | H04L 43/0882 |
| 11,122,491 | B2* | 9/2021 | Pignataro | H04L 47/283 |
| 2018/0150256 | A1* | 5/2018 | Kumar | G06F 3/0653 |

(Continued)

OTHER PUBLICATIONS

Github, mhiral "A "MTU exceeded" report may be useful to have #13", dated Jan. 31, 2018, pp. 1-2.

*Primary Examiner* — Melvin H Pollack
(74) *Attorney, Agent, or Firm* — Kunzler Bean & Adamson; Bruce R. Needham

(57) ABSTRACT

A method for optimizing telemetry packet for in-band telemetry includes receiving a telemetry packet at a network node in a communication pathway between a sending host sending data packets to a receiving host and determining telemetry data for the network node. The telemetry data includes latency information for data packet processing of the network node. The method includes adding metadata to the telemetry packet, where the metadata is added after a header and a telemetry packet header and after any metadata added by any upstream network nodes. The metadata includes the telemetry data and the metadata overwrites a portion of a payload of the telemetry packet. The method includes, in response to adding the metadata to the telemetry packet, transmitting the telemetry packet to a next destination.

20 Claims, 7 Drawing Sheets

(56) References Cited

U.S. PATENT DOCUMENTS

| | | | |
|---|---|---|---|
| 2019/0014394 A1* | 1/2019 | Anand | H04L 9/3242 |
| 2019/0116122 A1* | 4/2019 | Friedman | H04L 47/12 |
| 2020/0067792 A1* | 2/2020 | Aktas | H04L 43/0829 |
| 2020/0186465 A1* | 6/2020 | Dontula Venkata | H04L 41/0896 |
| 2020/0195553 A1* | 6/2020 | Yigit | H04L 43/0805 |
| 2020/0220793 A1* | 7/2020 | Hira | H04L 43/065 |
| 2020/0280518 A1* | 9/2020 | Lee | H04L 47/30 |
| 2020/0296007 A1* | 9/2020 | Finn, II | H04L 41/145 |
| 2020/0322287 A1* | 10/2020 | Connor | H04L 49/356 |
| 2020/0349045 A1* | 11/2020 | Van De Groenendaal | G06F 11/3024 |
| 2020/0389409 A1* | 12/2020 | Karuppiah | H04L 47/33 |
| 2020/0412627 A1* | 12/2020 | Monetti | H04L 43/065 |
| 2020/0412633 A1* | 12/2020 | Song | H04L 43/10 |
| 2020/0412659 A1* | 12/2020 | Arditti Ilitzky | H04L 49/25 |
| 2020/0412670 A1* | 12/2020 | Arditti Ilitzky | H04L 49/9057 |
| 2021/0021503 A1* | 1/2021 | Kfir | H04L 43/062 |
| 2021/0160275 A1* | 5/2021 | Anderson | H04L 63/1458 |
| 2021/0194894 A1* | 6/2021 | Anderson | H04L 63/1425 |
| 2021/0218647 A1* | 7/2021 | Rangarajan | H04L 43/08 |
| 2021/0218651 A1* | 7/2021 | Rangarajan | H04L 43/0858 |
| 2021/0234919 A1* | 7/2021 | Paralikar | H04L 67/125 |
| 2021/0306166 A1* | 9/2021 | Piasetzky | H04L 12/4633 |

\* cited by examiner

IN-BAND TELEMETRY PACKET SIZE OPTIMIZATION

FIELD

The subject matter disclosed herein relates to sending telemetry packets and more particularly relates to optimizing a size of in-band telemetry packets.

BACKGROUND

Whenever a new data packet flow in a communication pathway from a sending host to a receiving host in an in-band data network needs to be monitored, the system administrator or network controller specifies parameters to monitor the data flow. In some cases, the parameters include a 5-tuple of parameters that define the data packet flow (source/destination IP address, source/destination port number, and protocol). In some embodiments, using the configured flow information, network nodes of the communication pathway can detect live-traffic matching the data packet flow specification, create a copy of each sampled packet to create a telemetry packet (or create a new header and payload to create the telemetry packet), and add telemetry information to the sampled copies the data packet flow.

The in-band telemetry packet includes a common header and telemetry packet header (added by an ingress node) plus metadata headers, which are added by each network node along the communication pathway. The insertion of these headers leads to an increase in the size of the telemetry packet. This increase may cause at least two types of problems: a) network nodes may discard or fragment these packets if their size exceeds the maximum allowed size in the network (Maximum Transmission Unit or "MTU"); b) increased telemetry packet sizes may lead to increased latency, which departs from the behavior of the original live-traffic to be analyzed.

BRIEF SUMMARY

A method for optimizing telemetry packet for in-band telemetry is disclosed. An apparatus and computer program product also perform the functions of the apparatus. The method includes receiving a telemetry packet at a network node in a communication pathway between a sending host sending data packets to a receiving host and determining telemetry data for the network node. The telemetry data includes latency information for data packet processing of the network node. The method includes adding metadata to the telemetry packet, where the metadata is added after a header and a telemetry packet header and after any metadata added by any upstream network nodes. The metadata includes the telemetry data and the metadata overwrites a portion of a payload of the telemetry packet. The method includes, in response to adding the metadata to the telemetry packet, transmitting the telemetry packet to a next destination.

An apparatus for optimizing telemetry packet for in-band telemetry includes a telemetry packet receiver circuit that is configured to receive a telemetry packet at a network node in a communication pathway between a sending host sending data packets to a receiving host and a telemetry data circuit that is configured to determine telemetry data for the network node. The telemetry data includes latency information for data packet processing of the network node. The apparatus includes a metadata addition circuit that is configured to add metadata to the telemetry packet. The metadata is added after a header and a telemetry packet header and after any metadata added by any upstream network nodes. The metadata includes the telemetry data and the metadata overwrites a portion of a payload of the telemetry packet. The apparatus includes a telemetry packet transmission circuit that, in response to the metadata addition circuit adding the metadata to the telemetry packet, is configured to transmit the telemetry packet to a next destination.

A program product for in-band telemetry packet size optimization includes a computer readable storage medium and program code. The program code is configured to be executable by a processor to perform operations that include receiving a telemetry packet at a network node in a communication pathway between a sending host sending data packets to a receiving host and determining telemetry data for the network node. The telemetry data includes latency information for data packet processing of the network node. The program code is configured to be executable by a processor to perform operations that include adding metadata to the telemetry packet where the metadata is added after a header and a telemetry packet header and after any metadata added by any upstream network nodes. The metadata includes the telemetry data and wherein the metadata overwrites a portion of a payload of the telemetry packet. The program code is configured to be executable by a processor to perform operations that include, in response to adding the metadata to the telemetry packet, transmitting the telemetry packet to a next destination.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
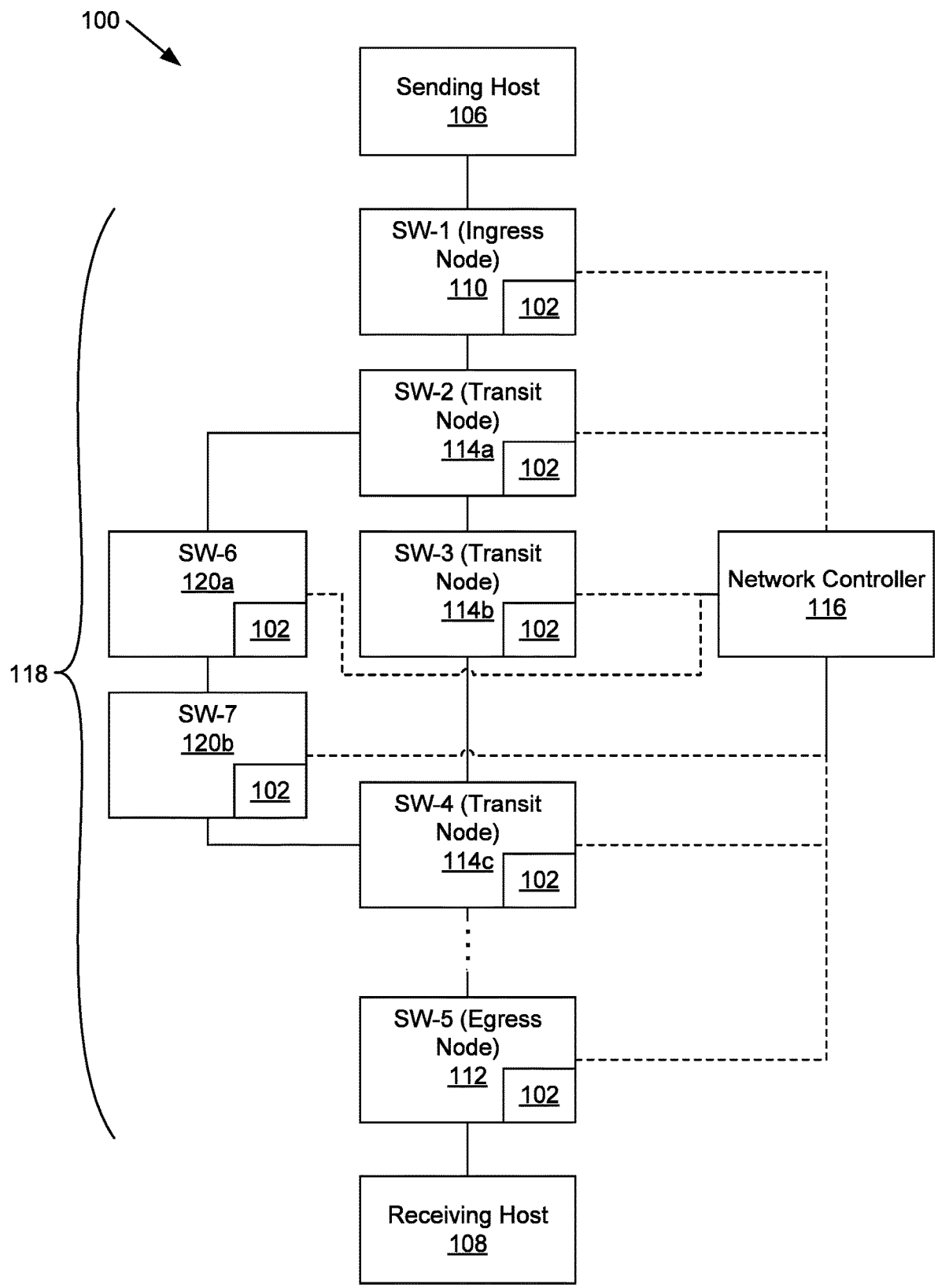
FIG. 1 is a schematic block diagram illustrating one embodiment of a data network for in-band telemetry.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for optimizing telemetry packet for in-band telemetry is disclosed. An apparatus and computer program product also perform the functions of the apparatus. The method includes receiving a telemetry packet at a network node in a communication pathway between a sending host sending data packets to a receiving host and determining telemetry data for the network node. The telemetry data includes latency information for data packet processing of the network node. The method includes adding metadata to the telemetry packet, where the metadata is added after a header and a telemetry packet header and after any metadata added by any upstream network nodes. The metadata includes the telemetry data and the metadata overwrites a portion of a payload of the telemetry packet. The method includes, in response to adding the metadata to the telemetry packet, transmitting the telemetry packet to a next destination.

In some embodiment, in response to the network node being an ingress node of the communication pathway, receiving a telemetry packet includes receiving a data packet and the method further includes copying the data packet to create the telemetry packet and adding a telemetry packet header to the telemetry packet after a main header. The telemetry packet header overwrites a portion of the payload and the metadata added to the telemetry packet includes latency data of the ingress node. In other embodiments, the telemetry packet is a same size as the copied data packet. In other embodiments, the method incudes overwriting each bit of the payload. In other embodiments, a size of the telemetry packet is maintained as the metadata is added to the telemetry packet. In further embodiments, the size of the telemetry packet is maintained until a combination of a telemetry packet header and metadata added to the telemetry packet exceed a size of the payload of the telemetry packet.

In some embodiments, a portion of the payload of the telemetry packet after the metadata consists of zeros. In other embodiments, in response to the network node being an ingress node of the communication pathway, receiving a telemetry packet includes receiving a command to create a telemetry packet and the method includes creating the telemetry packet, where a main header of the telemetry packet matches a main header of a data packet being transmitted from the sending host to the receiving host, adding a telemetry packet header to the telemetry packet after the main header, and adding a payload to the telemetry packet. The metadata added to the telemetry packet includes latency data of the ingress node and a size of the telemetry packet matches a size of the data packet. In a further embodiment, the telemetry packet includes the main header, which is followed by the telemetry packet header, which is followed by the metadata that includes latency data of the ingress node, which is followed by a payload where the payload consists of bits with a value of zero.

An apparatus for optimizing telemetry packet for in-band telemetry includes a telemetry packet receiver circuit that is configured to receive a telemetry packet at a network node in a communication pathway between a sending host sending data packets to a receiving host and a telemetry data circuit that is configured to determine telemetry data for the network node. The telemetry data includes latency information for data packet processing of the network node. The apparatus includes a metadata addition circuit that is configured to add metadata to the telemetry packet. The metadata is added after a header and a telemetry packet header and after any metadata added by any upstream network nodes. The metadata includes the telemetry data and the metadata overwrites a portion of a payload of the telemetry packet. The apparatus includes a telemetry packet transmission circuit that, in response to the metadata addition circuit adding the metadata to the telemetry packet, is configured to transmit the telemetry packet to a next destination.

In some embodiments, in response to the network node being an ingress node of the communication pathway, receiving a telemetry packet includes receiving a data packet and the apparatus includes a data packet copy circuit that is configured to copy the data packet to create the telemetry packet, and a telemetry header circuit that is configured to add a telemetry packet header to the telemetry packet after a main header. The telemetry packet header overwrites a portion of the payload and the metadata added to the telemetry packet includes latency data of the ingress node. In other embodiments, the telemetry packet is a same size as the copied data packet. In other embodiments, the apparatus includes a payload clearing circuit that is configured to overwrite each bit of the payload.

In some embodiments, a size of the telemetry packet is maintained as the metadata is added to the telemetry packet. In other embodiments, a portion of the payload of the telemetry packet after the metadata consists of zeros. In other embodiments, in response to the network node being an ingress node of the communication pathway, receiving a telemetry packet includes receiving a command to create a telemetry packet and the apparatus includes a telemetry packet creation circuit that is configured to create the telemetry packet, where a main header of the telemetry packet matches a main header of a data packet being transmitted from the sending host to the receiving host, add a telemetry packet header to the telemetry packet after the main header, and add a payload to the telemetry packet. The metadata added to the telemetry packet includes latency data of the ingress node and a size of the telemetry packet matches a size of the data packet.

A program product for in-band telemetry packet size optimization includes a computer readable storage medium and program code. The program code is configured to be executable by a processor to perform operations that include receiving a telemetry packet at a network node in a communication pathway between a sending host sending data packets to a receiving host and determining telemetry data for the network node. The telemetry data includes latency information for data packet processing of the network node. The program code is configured to be executable by a processor to perform operations that include adding metadata to the telemetry packet where the metadata is added after a header and a telemetry packet header and after any metadata added by any upstream network nodes. The metadata includes the telemetry data and wherein the metadata overwrites a portion of a payload of the telemetry packet. The program code is configured to be executable by a processor to perform operations that include, in response to adding the metadata to the telemetry packet, transmitting the telemetry packet to a next destination.

In some embodiments, in response to the network node being an ingress node of the communication pathway, receiving a telemetry packet includes receiving a data packet, and wherein the program code is further configured to be executable by a processor to perform operations that include copying the data packet to create the telemetry packet, adding a telemetry packet header to the telemetry packet after a main header, where the telemetry packet header overwrites a portion of the payload, and writing a zero over each bit of the payload. The metadata added to the telemetry packet includes latency data of the ingress node and overwrites a portion of the payload and the telemetry packet is a same size as the copied data packet. In other embodiments, a size of the telemetry packet is maintained as the metadata is added to the telemetry packet and a portion of the payload of the telemetry packet after the metadata consists of zeros.

In some embodiments, in response to the network node being an ingress node of the communication pathway, receiving a telemetry packet includes receiving a command to create a telemetry packet and the program code is further configured to be executable by a processor to perform operations that include creating the telemetry packet, where a main header of the telemetry packet matches a main header of a data packet being transmitted from the sending host to the receiving host, adding a telemetry packet header to the telemetry packet after the main header, and adding a payload to the telemetry packet. The payload consists of bits with a value of zero and the metadata added to the telemetry packet includes latency data of the ingress node. A size of the telemetry packet matches a size of the data packet.

FIG. 1 is a schematic block diagram illustrating one embodiment of a data network 100 for in-band telemetry. The data network 100 with network nodes 118, which include a first switch (SW-1) which is an ingress node 110, a fifth switch (SW-5) which is an egress node 112, switches SW-2, SW-3, and SW-4 which are transit nodes 114a-c (generically or collectively "114"), and redundant switches SW-6 120a and SW-7 120b (generically or collectively "120") connecting a sending host 106 and a receiving host 108. The network nodes 118 are connected to a network controller 116 and the network nodes 118 each include a telemetry apparatus 102. The data network 100 is described in detail below.

The data network 100 includes a sending host 106 and a receiving host 108, which are computing devices connected to network nodes 118 of the data network 100. The computing devices may be a host, a server, a workstation, a portable electronic device, etc. For example, the data network 100 may be in a data center, may be part of a computer network of a company, or other data network where a network controller 116 communicates with each network node 118. In the embodiments described herein, in-band refers to data flows, telemetry information, etc. that are controlled by the network controller 116 rather than external networks administered by various parties. For example, the sending host 106 and/or receiving host 108 may be part of multi-tenant servers with virtual machines each accessed by a client. In some embodiments, the sending host 106 and the receiving host 108 are computing devices configured for user access with a direct data connection to the ingress node 110 or egress node 112. In some embodiments, the data network 100 includes a connection to one or more external networks, such as the Internet, a wide-area-network, a cellular network, and the like.

The network nodes 118, are data transmission devices that facilitate receiving and sending data packets from the sending host 106 to the receiving host 108. A network node 118 may be a switch, a router or other transport device. In some embodiments, the network nodes 118 are layer-4 devices where layer-4 is the fourth layer in the Open Systems Interconnection ("OSI") Model. In other embodiments, the network nodes 118 transmit packets using transmission control protocol/internet protocol ("TCP/IP"), user datagram protocol ("UDP") or other protocol. In other embodiments, the switches SW-1 to SW-7 are switches, routers or other devices with layer-4, TCP/IP, UDP or other capabilities. While seven switches SW-1 to SW-7 are depicted in FIG. 1, the data network 100 may include more switches or less switches. The network nodes 118 typically include a discovery mechanism that discovers connected network nodes 118 and other devices, such as the sending host 106 and receiving host 108 where information about the connected devices 106, 108, 118 are stored in a routing table. The routing table is some type of data structure, such as a register, a database, etc. Typically, the routing table includes whether or not a particular device, such as the sending host 106 or receiving host 108 are directly connected to a network node 118.

The routing table may also include a particular egress port of a network node 118 that connects to a downstream network node 118. For example, switch SW-2 114a may be connected to switch SW-3 114b on egress port A and to switch SW-6 120a on egress port B. The routing table, in some embodiments, includes which egress port of a network node 118 connects to a downstream network node 118. Typically, each network node 118 includes more than one egress port. For example, a network node 118 may include 128 egress ports. Typically, each network node 118 includes a plurality of ingress ports, which may also be listed in the routing table. In other embodiments, each network node 118 includes a table or other data structure that stores information about which downstream network node 118 is connected to each egress port and which upstream network node 118 is connected to each ingress port and an external routing table keeps track of network node connections without port information.

Each egress port of a network node 118 includes two or more queues (e.g. egress queues). In some embodiments, each egress port includes 10 queues. For example, an egress port may use eight queues for uni-path data transmission and may have two queues for multi-path data transmission. Other egress ports have 16 queues or other number of queues. In some embodiments, each queue of an egress port is assigned a priority level. For example, a first queue may be a highest priority queue, a second queue may be a second highest priority queue. Priority of the egress ports is typically used to segregate data packets based on a priority level of the data packets. Typically, some data packets are higher priority than other data packets so that the queues of an egress port allow higher level data packets to be sent before lower level data packets. Sending of data packets from the various queues, in some embodiments, is subject to particular rules to allow prioritizing data packets while ensuring all data packets are sent.

In some embodiments, a telemetry routing process used by the apparatuses 200, 300 described below registers with the network nodes 118. As the data network 100 changes, data paths change which may affect routing from a sending host 106 to a receiving host 108, which affects telemetry routing.

The network nodes 118 are connected to a network controller 116. In some embodiments, the network nodes 118 are connected to the network controller 116 over a back channel which is not part of data flow between the sending host 106 and the receiving host 108. In one embodiment, the network controller 116 communicates with the network nodes 118 over network connections that carry data. In other embodiments, the network controller 116 communicates with the network nodes 118 over a side-band or out-of-band connection that is not part of data flow. In some embodiments, the network controller 116 is connected directly to each network node 118. In other embodiments, the network controller 116 is connected indirectly to at least some network nodes 118. One of skill in the art will recognize other ways to connect the network controller 116 to the network nodes 118 and other ways to for the network controller 116 to manage the network nodes 118.

Network connections between the sending host 106 and ingress node 110, the receiving host 108 and egress node 112 and between network nodes 118 may be wired, wireless, fiber connections, and the like. The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

As depicted in FIG. 1, each network node 118 includes a telemetry apparatus 102. The telemetry apparatus 102 is described in more detail with regards to the apparatuses 200, 300 of FIGS. 2 and 3. The data network 100 depicts only two hosts and a few network nodes 118, however, the data networks 100 is representative of other data networks with more hosts and other devices connected to network nodes as well as data networks with more network nodes in other configurations. The network nodes 118 are depicted with multiple data paths from the sending host 106 to the receiving host 108. Additional parallel data paths may also exist from the sending host 106 to the receiving host 108. Often, a preferred data path exists from a sending host 106 to a receiving host 108, but other data paths may be used, for example, if the preferred pathway is unavailable, is slow, etc.

Figure 2:
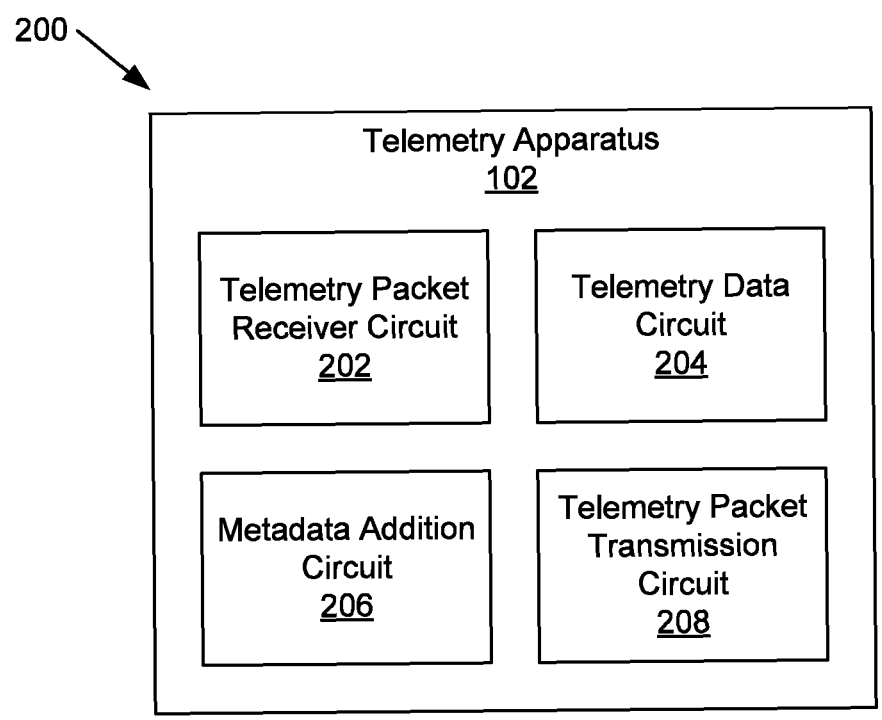
FIG. 2 is a schematic block diagram illustrating one embodiment of an apparatus for optimizing a size of in-band telemetry packets.

FIG. 2 is a schematic block diagram illustrating one embodiment of an apparatus 200 for optimizing a size of in-band telemetry packets. The apparatus 200 includes one embodiment of a telemetry apparatus 102 that includes a telemetry packet receiver circuit 202, a telemetry data circuit 204, a metadata addition circuit 206 and a telemetry packet transmission circuit 208, which are described below. In various embodiments, all or portions of the telemetry apparatus 102 are implemented using hardware circuits. For example, the portions of the telemetry apparatus 102 may be implemented using registers, gates, ports, a controller, etc. In some embodiments, all or parts of the telemetry apparatus 102 are implemented with an application specific integrated circuit ("ASIC"). In other embodiments, all or parts of the telemetry apparatus 102 are implemented with a programmable hardware device, such as a field programmable gate array ("FPGA"), programmable logic array, etc. In other embodiments, all or a portion of the telemetry apparatus 102 is implemented with program code executable on a processor of a network node 118, which is typically optimized for data transmission. One of skill in the art will recognize other ways to implement the telemetry apparatus 102, which may include one or more of the methods described above.

The apparatus 200 includes a telemetry packet receiver circuit 202 that is configured to receive a telemetry packet at a network node 118 in a communication pathway between a sending host 106 sending data packets to a receiving host 108. A telemetry packet is a data packet that is used to determined latency of the network nodes 118 to determine latency of data packets being transmitted from the sending host 106 to the receiving host 108. A telemetry packet starts at the ingress node 110. Each network node 118 in the communication pathway adds metadata that includes latency data of the network node 118. After the metadata from the egress node 112 is added, the telemetry packet is transmitted to the network controller 116 for analysis. Typically, the network controller 116 initiates transmission of a telemetry packet and a system administrator may direct the network controller 116 to initiate the telemetry packets. Transit nodes 114, 120 and the egress node 112 receive a telemetry packet from an upstream network node 118, and after latency data is added in the form of metadata to the telemetry packet, the telemetry packet is transmitted to a next destination, which may be another network node 118 or to the network controller 116. The ingress node 110 typically creates a telemetry packet before adding metadata with latency data.

The apparatus 200 includes a telemetry data circuit 204 that is configured to determine telemetry data for the network node 118. The telemetry data includes latency information for data packet processing of the network node 118. The apparatus 200 includes a metadata addition circuit 206 that is configured to add metadata to the telemetry packet. The metadata is added after a header and a telemetry packet header and after any metadata added by any upstream network nodes 118. The metadata includes the determined telemetry data.

Figure 4:
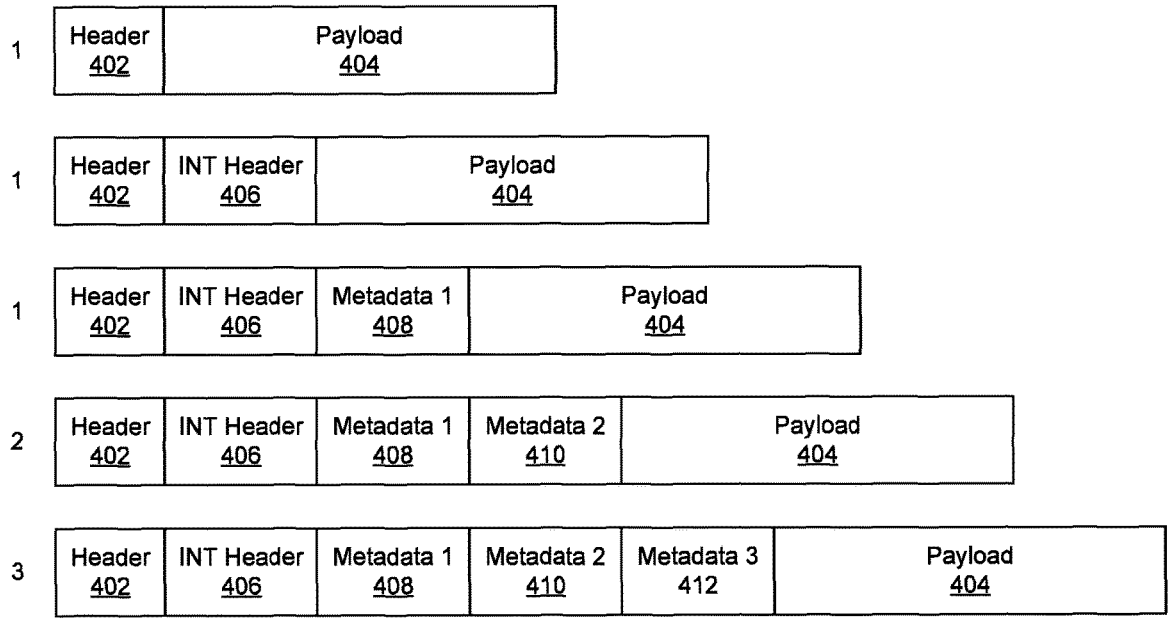
FIG. 4 is a schematic block diagram illustrating one embodiment of a prior art method of adding telemetry data to an in-band telemetry packet.

For the telemetry apparatuses 102 included herein, the metadata overwrites a portion of a payload of the telemetry packet. As depicted in FIG. 4, in prior art methods, a typical telemetry packet starts at the ingress node 110 (e.g. node 1) with header 402 and a payload 404 when the telemetry packet is first created. The header 402 is a same header as the data packets and typically includes a source internet protocol ("IP") address, a destination IP address, a source port number, a destination port number, and a protocol type. Other transmission protocols may include different information in the header 402. The header 402 includes information necessary for each network node 118 to route the data packets and telemetry packets from the sending host 106 to the receiving host 108 along the communication pathway. To signal to each network node 118 and the network controller 116, an inbound telemetry ("INT") packet header 406 is added to the telemetry packet at the ingress node 110 (node 1). The network node 118 adds telemetry data for the network node 118 in the form of metadata (e.g. metadata 1 408 for the ingress node 110, node 1) to the telemetry packet.

For this prior art method, when the telemetry packet header 406 and each time metadata (e.g. 408, 410, 412, etc.) is added to a telemetry packet, the payload 404 is shifted so that the telemetry packet grows in size when the telemetry packet header 406 is added and each time metadata 408, 410, 412 is added to the telemetry packet, which differs from data packets traveling along the communication pathway. Typically, data packets transmitted along the communication pathway are a same size during transmission along the communication pathway and have a same size header 402 and a same size payload 404. As the telemetry packet grows in size, the telemetry packet requires more processing so telemetry packets may take more time to traverse the communication pathway than data packets. Memory of the network nodes 118 is typically divided into frames, each of a same size. The data packets are typically sized to be a frame width or less. As a telemetry packet grows in size as telemetry data is added, the telemetry packets may reach a frame width and may then need to be split into two parts. Telemetry packets split into two parts also do not mimic data packet travel time due to added processing time for a telemetry packet in two parts. Note that the header 402, payload 404, inbound telemetry packet header 406, and metadata 408, 410, 412 are not drawn to any relevant scale in FIGS. 4 and 5 and a width of each is depicted for convenience.

Figure 5:
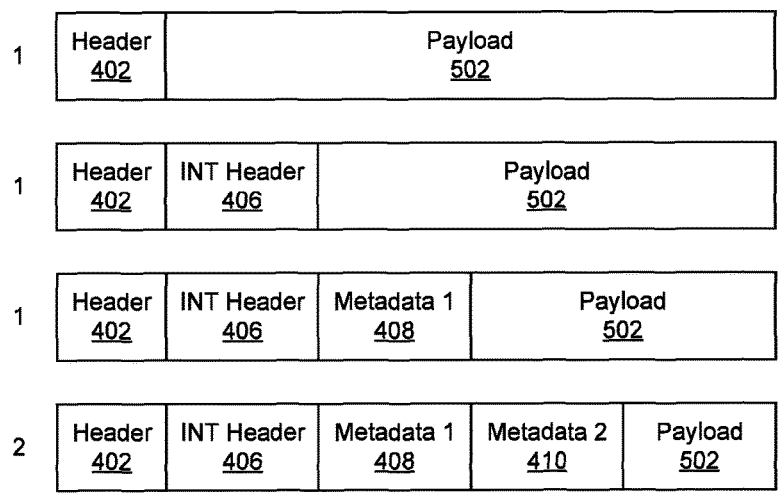
FIG. 5 is a schematic block diagram illustrating one embodiment of a method of adding telemetry data to an in-band telemetry packet while optimizing a size of the telemetry packets.

The telemetry apparatus 102 described herein maintains telemetry packets a same width as the telemetry packet header 406 and metadata 408, 410, 412, etc. are added, as depicted in FIG. 5. When the telemetry packet header 406 is added, it overwrites a portion of the payload 502. Then metadata 408 from the ingress node 110 is added by the metadata addition circuit 206 and again the metadata 408 overwrites a portion of the payload 502. At each network node 118, the metadata addition circuit 206 overwrites a portion of the payload 502 to maintain the payload 502 at a same size as long as possible. In some embodiments, the metadata addition circuit 206 is configured to update a size of the payload 502 in the metadata of the telemetry packet for the network nodes 118 to determine an end to the payload 502. If there is an instance where the added telemetry packet header 406 and metadata 408, 410, 412, etc. exceed the size of the payload 502, the telemetry packet will increase in size and may even need to be split in two if the telemetry packet size exceeds the size of memory frames in the network nodes 118. Typically, communication pathways are only a few hops of network nodes 118 so the telemetry packet header 406 and metadata 408, 410, 412 exceeding the size of the payload 502 is somewhat unlikely and chances of the telemetry packet having to be split into two are even less and would occur much less than the prior art method depicted in FIG. 4.

The apparatus 200 includes a telemetry packet transmission circuit 208 that, in response to the metadata addition circuit 206 adding the metadata to the telemetry packet, is configured to transmit the telemetry packet to a next destination. In some embodiments, the next destination is another network node 118. Where a current location of the telemetry packet is the egress node 112, the next destination is the network controller 116.

Figure 3:
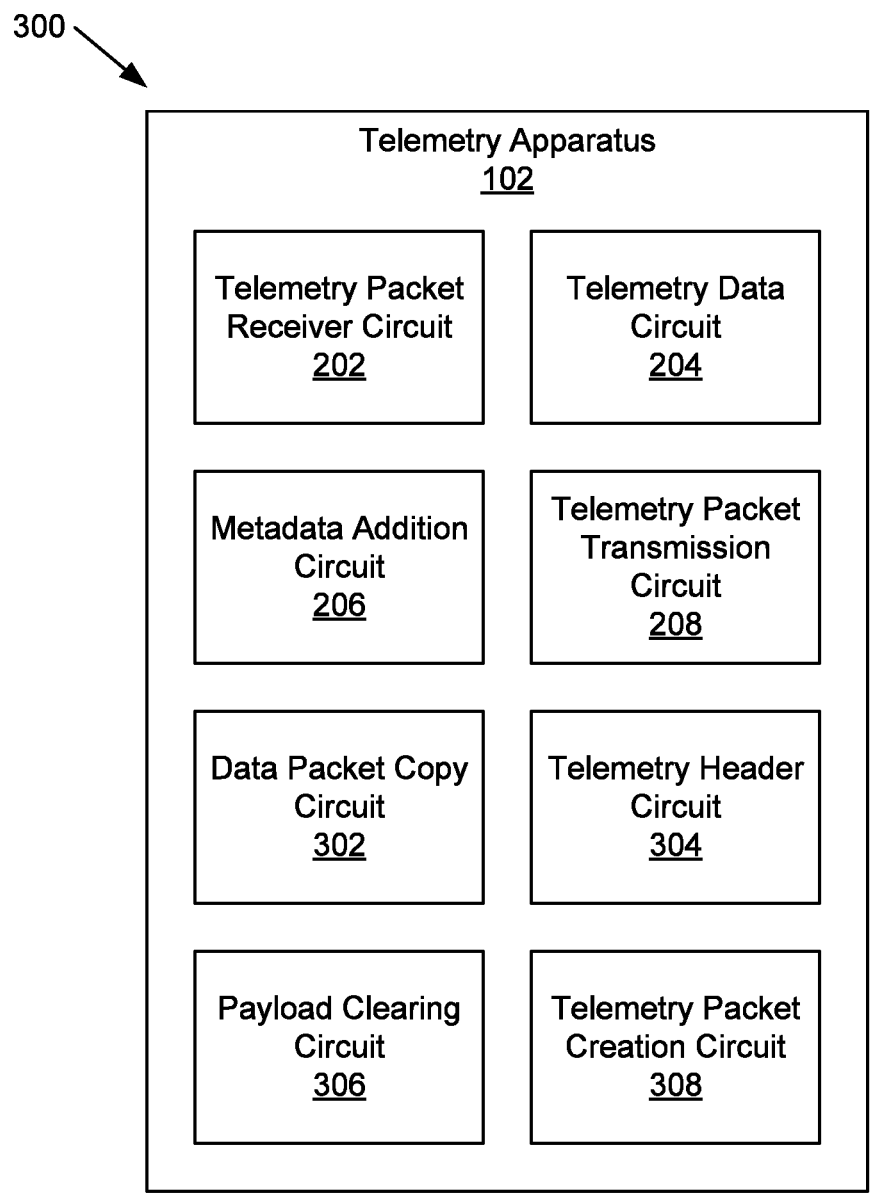
FIG. 3 is a schematic block diagram illustrating another embodiment of an apparatus for optimizing a size of in-band telemetry packets.

FIG. 3 is a schematic block diagram illustrating another embodiment of an apparatus 300 for optimizing a size of in-band telemetry packets. The apparatus 300 includes another embodiment of a telemetry apparatus 102 that includes a telemetry packet receiver circuit 202, a telemetry data circuit 204, a metadata addition circuit 206 and a telemetry packet transmission circuit 208, which are substantially similar to those described above in relation to the apparatus 200 of FIG. 2. In various embodiments, the apparatus 300 includes a data packet copy circuit 302, a telemetry header circuit 304, a payload clearing circuit 306 and a telemetry packet creation circuit 308, which are described below.

The apparatus 300, in some embodiments, includes a data packet copy circuit 302 that is configured to copy a received data packet to create the telemetry packet and a telemetry header circuit 304 that is configured to add a telemetry packet header 406 to the telemetry packet after a main header 402. The telemetry header circuit 304 is configured to overwrite a portion of the payload 502 of the newly created telemetry packet with a telemetry packet header 406. The data packet copy circuit 302 and telemetry header circuit 304, in some embodiments, are active when the network node 118 is an ingress node 110. Typically, the data packet copy circuit 302 is configured to copy a data packet received by the ingress node 110 at the time when the telemetry apparatus 102 is creating a telemetry packet and a newly received data packet is in the ingress node 110. In the embodiment, telemetry packet is a same size as the copied data packet. The metadata 408 added by the metadata addition circuit 206 to the telemetry packet includes latency data of the ingress node 110.

In some embodiments, the apparatus 300 includes a payload clearing circuit 306 that is configured to overwrite each bit of the payload 502. For example, the payload clearing circuit 306 may overwrite each bit of the payload 502 with a zero. When the telemetry packet is created from a copied data packet, the payload 502 includes data. Thus, the telemetry packet may be intercepted and read by another party or by the network controller 116, which creates a security risk. The payload clearing circuit 306 is configured to eliminate this risk by over writing the data of the payload 502 with zeros. In other embodiments, payload clearing circuit 306 is configured to overwrite the data of the payload 502 with ones or another pattern where the data is changed for security reasons.

In embodiments where the telemetry apparatus 102 creates a telemetry packet without copying a data packet, the apparatus 300 includes a telemetry packet creation circuit 308 that is configured to create the telemetry packet and creates a main header 402 of the telemetry packet that matches a main header of a data packet being transmitted from the sending host 106 to the receiving host 108. The telemetry packet header signals network nodes 118 that the telemetry packet is a telemetry packet and not a data packet. The telemetry header circuit 304 is configured to add a telemetry packet header 406 to the telemetry packet after the main header 402 and the telemetry packet creation circuit 308 is configured to add a payload 502 to the telemetry packet. The metadata addition circuit 206 is configured to add metadata 408 to the telemetry packet that includes latency data of the ingress node 110. In the embodiment, the telemetry packet creation circuit 308 is configured to create a payload 502 such that a size of the telemetry packet matches a size of the data packet. In some embodiments, telemetry packet creation circuit 308 is configured to create a payload 502 with all zeros, all ones, or a specific pattern.

Figure 6:
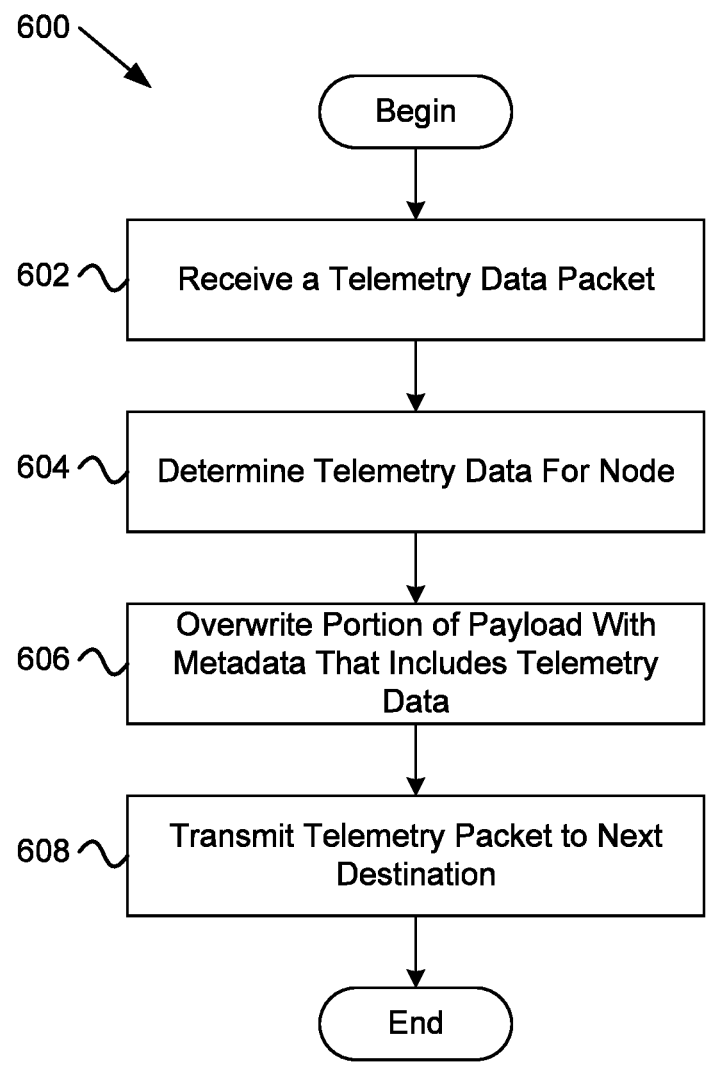
FIG. 6 is a schematic flow chart diagram illustrating one embodiment of a method for optimizing a size of in-band telemetry packets.

FIG. 6 is a schematic flow chart diagram illustrating one embodiment of a method 600 for optimizing a size of in-band telemetry packets. The method 600 begins and receives 602 a telemetry packet at a network node 118 in a communication pathway between a sending host 106 sending data packets to a receiving host 108 and determines 604 telemetry data for the network node 118. The telemetry data includes latency information for data packet processing of the network node 118. The method 600 overwrites 606 a portion of the payload 502 of the telemetry packet with metadata (e.g. 410) of the network node 118. The metadata 410 is added after a header 402 and a telemetry packet header 406 and after any metadata (e.g. 408) added by any upstream network nodes (e.g. 110). The metadata 410 includes the telemetry data of the network node 118. The method 600, in response to adding 606 the metadata 410 to the telemetry packet, transmits 608 the telemetry packet to a next destination (e.g. another network node 118), and the method 600 ends. In various embodiments, the method 600 is implemented using the telemetry packet receiver circuit 202, the telemetry data circuit 204, the metadata addition circuit 206 and/or the telemetry packet transmission circuit 208.

Figure 7:
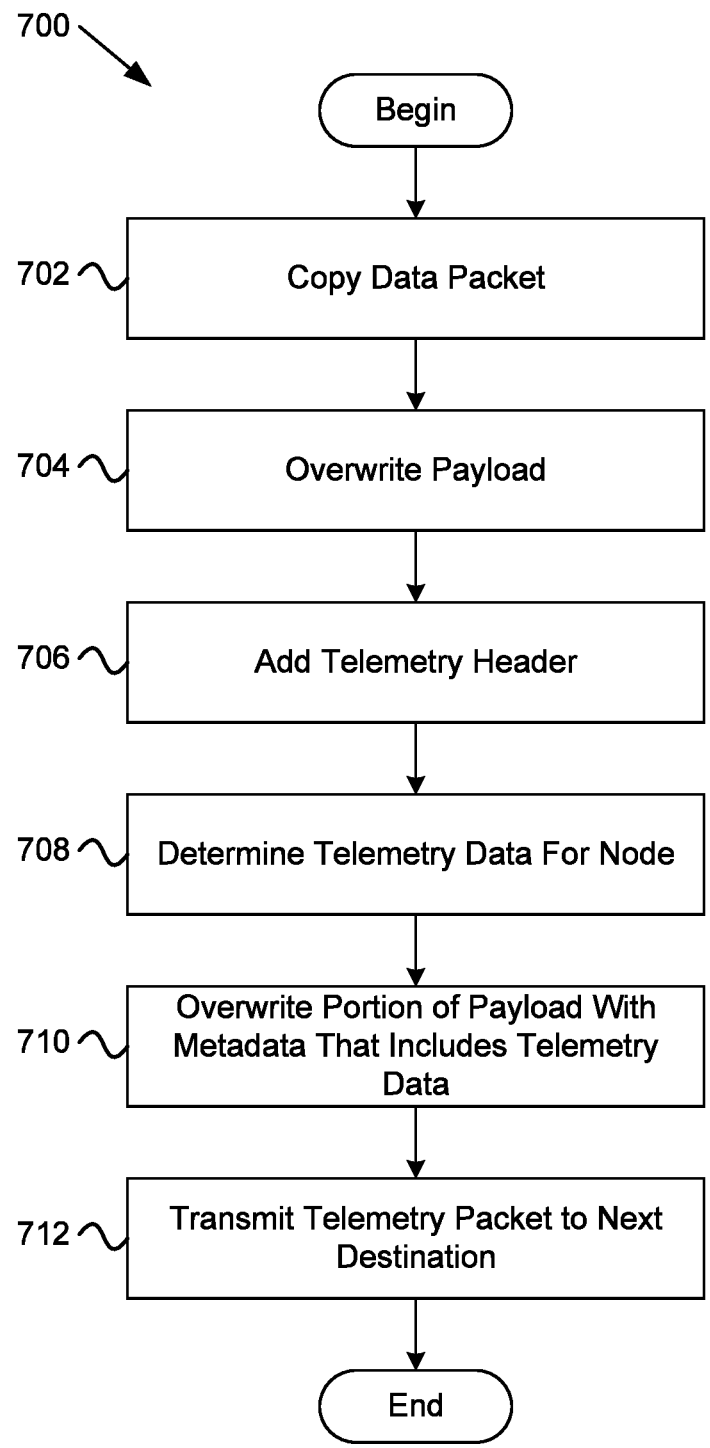
FIG. 7 is a schematic flow chart diagram illustrating another embodiment of a method for optimizing a size of in-band telemetry packets starting with a copied data packet.

FIG. 7 is a schematic flow chart diagram illustrating another embodiment of a method 700 for optimizing a size of in-band telemetry packets starting with a copied data packet. The method 700 begins at an ingress node 110 and copies 702 a received data packet being transmitted from a sending host 106 to a receiving host 108 along a communication pathway to create a telemetry packet. The new telemetry packet includes a header 402 and a payload 502. The header 402 of the telemetry packet causes the telemetry packet to be transmitted along the same communication pathway as the data packets, except the telemetry packet is transmitted to the network controller 116 at the egress node 112. The method 700 optionally, for security, overwrites 704 a payload of the data packet when creating the payload 502 of the telemetry packet. The method 700 adds 706 a telemetry packet header 406 after the main header 402, which overwrites a portion of the payload 502. The telemetry packet header 406 signals each network node 118 in the communication pathway that the telemetry packet is not a data packet, but is instead a telemetry packet.

The method 700 determines 708 telemetry data for the ingress node 110 where the telemetry data includes latency information for data packet processing of the ingress node 110. The method 700 overwrites 710 a portion of the payload 502 with metadata 408 that includes the telemetry data of the ingress node 110. The method 700 transmits 712 the telemetry packet to the next destination (e.g. transit node SW-1 114a), and the method 700 ends. In various embodiments, all or a portion of the method 700 is implemented using the telemetry packet receiver circuit 202, the telemetry data circuit 204, the metadata addition circuit 206, the telemetry packet transmission circuit 208, the data packet copy circuit 302, the telemetry header circuit 304 and/or the payload clearing circuit 306.

Figure 8:
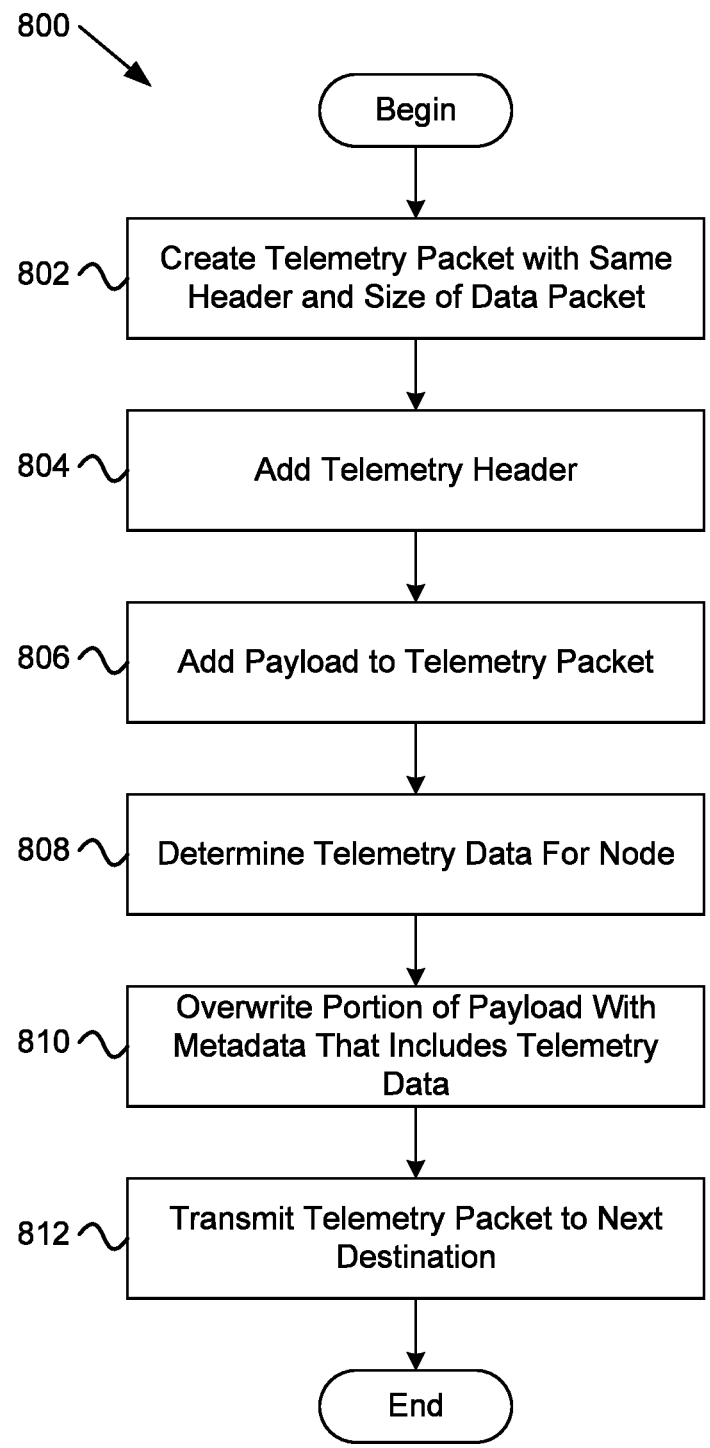
FIG. 8 is a schematic flow chart diagram illustrating another embodiment of a method for optimizing a size of in-band telemetry packets starting with a created data packet.

FIG. 8 is a schematic flow chart diagram illustrating another embodiment of a method 800 for optimizing a size of in-band telemetry packets starting with a created data packet. The method 800 begins at an ingress node 110 and creates 802 a telemetry packet with a same header 402 as data packets being transmitted from a sending host 106 to a receiving host 108 along a communication pathway. The telemetry packet with the header 402 of the data packets travels along the same communication pathway as the data packets. The method 800 adds 804 a telemetry packet header 406 after the main header 402 and adds 806 a payload 502 to the telemetry packet. In some embodiments, the payload 502 includes all zeros. In other embodiments, the payload 502 includes all ones. In other embodiments, the payload 502 includes bits in a pattern, such as 0, 1, 0, 1, . . . 0, 1.

The method 800 determines 808 telemetry data for the ingress node 110 where the telemetry data includes latency information for data packet processing of the ingress node 110. The method 800 overwrites 810 a portion of the payload 502 with metadata 408 that includes the telemetry data of the ingress node 110. In another embodiment, the method 800 adds the metadata 408 before adding 806 the payload 502. The method 800 transmits 812 the telemetry packet to the next destination (e.g. transit node SW-1 114a), and the method 800 ends. In various embodiments, all or a portion of the method 800 is implemented using the telemetry packet receiver circuit 202, the telemetry data circuit 204, the metadata addition circuit 206, the telemetry packet transmission circuit 208, the telemetry packet creation circuit 308, the telemetry header circuit 304 and/or the payload clearing circuit 306.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a telemetry packet at a network node in a communication pathway between a sending host sending data packets to a receiving host;
   determining telemetry data for the network node, the telemetry data comprising latency information for data packet processing of the network node;
   adding metadata to the telemetry packet, wherein the metadata is added after a header and a telemetry packet header and after any metadata added by any upstream network nodes, wherein the metadata comprises the telemetry data and wherein the metadata overwrites a portion of a payload of the telemetry packet; and
   in response to adding the metadata to the telemetry packet, transmitting the telemetry packet to a next destination.

2. The method of claim 1, wherein, in response to the network node comprising an ingress node of the communication pathway, receiving a telemetry packet comprises receiving a data packet and further comprising:
   copying the data packet to create the telemetry packet; and
   adding a telemetry packet header to the telemetry packet after a main header, wherein the telemetry packet header overwrites a portion of the payload, wherein the metadata added to the telemetry packet comprises latency data of the ingress node.

3. The method of claim 2, wherein the telemetry packet is a same size as the copied data packet.

4. The method of claim 2, further comprising overwriting over each bit of the payload.

5. The method of claim 1, wherein a size of the telemetry packet is maintained as the metadata is added to the telemetry packet.

6. The method of claim 5, wherein the size of the telemetry packet is maintained until a combination of a telemetry packet header and metadata added to the telemetry packet exceed a size of the payload of the telemetry packet.

7. The method of claim 1, wherein a portion of the payload of the telemetry packet after the metadata consists of zeros.

8. The method of claim 1, wherein, in response to the network node comprising an ingress node of the communication pathway, receiving a telemetry packet comprises receiving a command to create a telemetry packet and further comprising:
   creating the telemetry packet, wherein a main header of the telemetry packet matches a main header of a data packet being transmitted from the sending host to the receiving host;
   adding a telemetry packet header to the telemetry packet after the main header; and
   adding a payload to the telemetry packet, wherein the metadata added to the telemetry packet comprises latency data of the ingress node, and wherein a size of the telemetry packet matches a size of the data packet.

9. The method of claim 8, wherein the telemetry packet comprises the main header, which is followed by the telemetry packet header, which is followed by the metadata comprising latency data of the ingress node, which is followed by a payload, the payload consists of bits with a value of zero.

10. An apparatus comprising:
    a telemetry packet receiver circuit that is configured to receive a telemetry packet at a network node in a communication pathway between a sending host sending data packets to a receiving host;
    a telemetry data circuit that is configured to determine telemetry data for the network node, the telemetry data comprising latency information for data packet processing of the network node;
    a metadata addition circuit that is configured to add metadata to the telemetry packet, wherein the metadata is added after a header and a telemetry packet header and after any metadata added by any upstream network nodes, wherein the metadata comprises the telemetry data and wherein the metadata overwrites a portion of a payload of the telemetry packet; and
    a telemetry packet transmission circuit that, in response to the metadata addition circuit adding the metadata to the telemetry packet, is configured to transmit the telemetry packet to a next destination.

11. The apparatus of claim 10, wherein, in response to the network node comprising an ingress node of the communication pathway, receiving a telemetry packet comprises receiving a data packet and further comprising:
    a data packet copy circuit that is configured to copy the data packet to create the telemetry packet; and
    a telemetry header circuit that is configured to add a telemetry packet header to the telemetry packet after a main header, wherein the telemetry packet header overwrites a portion of the payload, wherein the metadata added to the telemetry packet comprises latency data of the ingress node.

12. The apparatus of claim 11, wherein the telemetry packet is a same size as the copied data packet.

13. The apparatus of claim 11, further comprising a payload clearing circuit that is configured to overwrite each bit of the payload.

14. The apparatus of claim 10, wherein a size of the telemetry packet is maintained as the metadata is added to the telemetry packet.

15. The apparatus of claim 10, wherein a portion of the payload of the telemetry packet after the metadata consists of zeros.

16. The apparatus of claim 10, wherein, in response to the network node comprising an ingress node of the communication pathway, receiving a telemetry packet comprises receiving a command to create a telemetry packet and further comprising a telemetry packet creation circuit that is configured to:

create the telemetry packet, wherein a main header of the telemetry packet matches a main header of a data packet being transmitted from the sending host to the receiving host;
add a telemetry packet header to the telemetry packet after the main header; and
add a payload to the telemetry packet, wherein the metadata added to the telemetry packet comprises latency data of the ingress node, and wherein a size of the telemetry packet matches a size of the data packet.

17. A program product for in-band telemetry packet size optimization comprising a computer readable storage medium and program code, the program code being configured to be executable by a processor to perform operations comprising:
receiving a telemetry packet at a network node in a communication pathway between a sending host sending data packets to a receiving host;
determining telemetry data for the network node, the telemetry data comprising latency information for data packet processing of the network node;
adding metadata to the telemetry packet, wherein the metadata is added after a header and a telemetry packet header and after any metadata added by any upstream network nodes, wherein the metadata comprises the telemetry data and wherein the metadata overwrites a portion of a payload of the telemetry packet; and
in response to adding the metadata to the telemetry packet, transmitting the telemetry packet to a next destination.

18. The program product of claim 17, wherein, in response to the network node comprising an ingress node of the communication pathway, receiving a telemetry packet comprises receiving a data packet, and wherein the program code is further configured to be executable by a processor to perform operations comprising:
copying the data packet to create the telemetry packet;
adding a telemetry packet header to the telemetry packet after a main header, wherein the telemetry packet header overwrites a portion of the payload; and
overwriting each bit of the payload, wherein the metadata added to the telemetry packet comprises latency data of the ingress node and overwrites a portion of the payload and wherein the telemetry packet is a same size as the copied data packet.

19. The program product of claim 17, wherein a size of the telemetry packet is maintained as the metadata is added to the telemetry packet and wherein a portion of the payload of the telemetry packet after the metadata consists of zeros.

20. The program product of claim 17, wherein, in response to the network node comprising an ingress node of the communication pathway, receiving a telemetry packet comprises receiving a command to create a telemetry packet and the program code is further configured to be executable by a processor to perform operations comprising:
creating the telemetry packet, wherein a main header of the telemetry packet matches a main header of a data packet being transmitted from the sending host to the receiving host;
adding a telemetry packet header to the telemetry packet after the main header; and
adding a payload to the telemetry packet, the payload consisting of bits with a value of zero, wherein the metadata added to the telemetry packet comprises latency data of the ingress node, and wherein a size of the telemetry packet matches a size of the data packet.

* * * * *